United States Patent
Wolosewicz

(10) Patent No.: US 11,444,940 B2
(45) Date of Patent: Sep. 13, 2022

(54) USER AUTHENTICATION OF SMART SPEAKER SYSTEM

(71) Applicant: Certus Technology Systems, Inc., San Francisco, CA (US)

(72) Inventor: Jack Wolosewicz, San Francisco, CA (US)

(73) Assignee: Certus Technology Systems, Inc., San Francisco, CA (US)

( * ) Notice: Subject to any disclaimer, the term of this patent is extended or adjusted under 35 U.S.C. 154(b) by 716 days.

(21) Appl. No.: 16/283,782

(22) Filed: Feb. 24, 2019

(65) Prior Publication Data

US 2020/0059468 A1 Feb. 20, 2020

Related U.S. Application Data

(60) Provisional application No. 62/634,825, filed on Feb. 24, 2018.

(51) Int. Cl.
*H04L 9/40* (2022.01)
*G10L 15/22* (2006.01)
*H04W 12/63* (2021.01)

(52) U.S. Cl.
CPC .......... *H04L 63/0861* (2013.01); *G10L 15/22* (2013.01); *H04L 63/0838* (2013.01); *H04L 63/0892* (2013.01); *G10L 2015/223* (2013.01); *H04W 12/63* (2021.01)

(58) Field of Classification Search
CPC .............. H04L 63/0861; H04L 63/0838; H04L 63/0892; G10L 15/22; G10L 2015/223
See application file for complete search history.

(56) References Cited

U.S. PATENT DOCUMENTS

| 9,119,076 | B1* | 8/2015 | Gubbi | H04L 63/0853 |
| 10,789,957 | B1* | 9/2020 | Tiwari | H04L 67/125 |
| 2006/0094403 | A1* | 5/2006 | Norefors | H04L 63/0838 455/411 |
| 2014/0109211 | A1* | 4/2014 | Suzuki | G06F 21/35 726/7 |

(Continued)

FOREIGN PATENT DOCUMENTS

WO  WO2015/187533  * 12/2015 ............. G06Q 20/16

OTHER PUBLICATIONS

Marc Conrad, Tim French : "My Mouse—My Music", Department of Computer Science and Technology, University of Bedfordshire, UK, 2010, 15 pages http://perisic.com/mousemusic (Year: 2010).*

(Continued)

*Primary Examiner* — Catherine Thiaw
(74) *Attorney, Agent, or Firm* — Soody Tronson; STLG Firm

(57) ABSTRACT

Methods for authenticating a user utilizing a smart speaker system are presented, the methods including: requesting a user authentication by issuing a voice command to a smart speaker; playing a sonic one-time password (OTP) on the smart speaker received from an authentication server in response to the requesting a user authentication; receiving the sonic OTP by a mobile device of the user; transmitting an OTP decoded from the sonic OTP to the authentication server; and authorizing the user by the authentication server to execute a secure transaction using the smart speaker system.

18 Claims, 5 Drawing Sheets

(56) References Cited

U.S. PATENT DOCUMENTS

2015/0089607 A1* 3/2015 Hubner .............. H04L 63/0838
　　　　　　　　　　　　　　　　　　　　　　726/6
2016/0080381 A1* 3/2016 Hall ........................ G06F 21/31
　　　　　　　　　　　　　　　　　　　　　　726/7

OTHER PUBLICATIONS

Chen Fei, Wu Kehe, Chen Wei, Zhang Qianyuan : "The research and implementation of the VPN gateway based on SSL", IEEE, 2013, p. 1376-1379 (Year: 2013).*

* cited by examiner

USER AUTHENTICATION OF SMART SPEAKER SYSTEM

TECHNICAL FIELD

This disclosure relates to techniques for authentication of users for voice-interactive smart-speaker systems.

BACKGROUND

Current user authentication in voice-controlled systems relies primarily on user authentication via user voice recognition. This is a form of biometric user authentication, which is deeply flawed and presents a poor user experience.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, methods for authenticating a user utilizing a smart speaker system are presented, the methods including: requesting a user authentication by issuing a voice command to a smart speaker; playing a sonic one-time password (OTP) on the smart speaker received from an authentication server in response to the requesting a user authentication; receiving the sonic OTP by a mobile device of the user; transmitting an OTP decoded from the sonic OTP to the authentication server; and authorizing the user by the authentication server to execute a secure transaction using the smart speaker system.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The present technique(s) will be described further, by way of example, with reference to embodiments thereof as illustrated in the accompanying drawings. It should be understood, however, that the accompanying drawings illustrate only the various implementations described herein and are not meant to limit the scope of various techniques, methods, systems, or apparatuses described herein.

Figure 1:
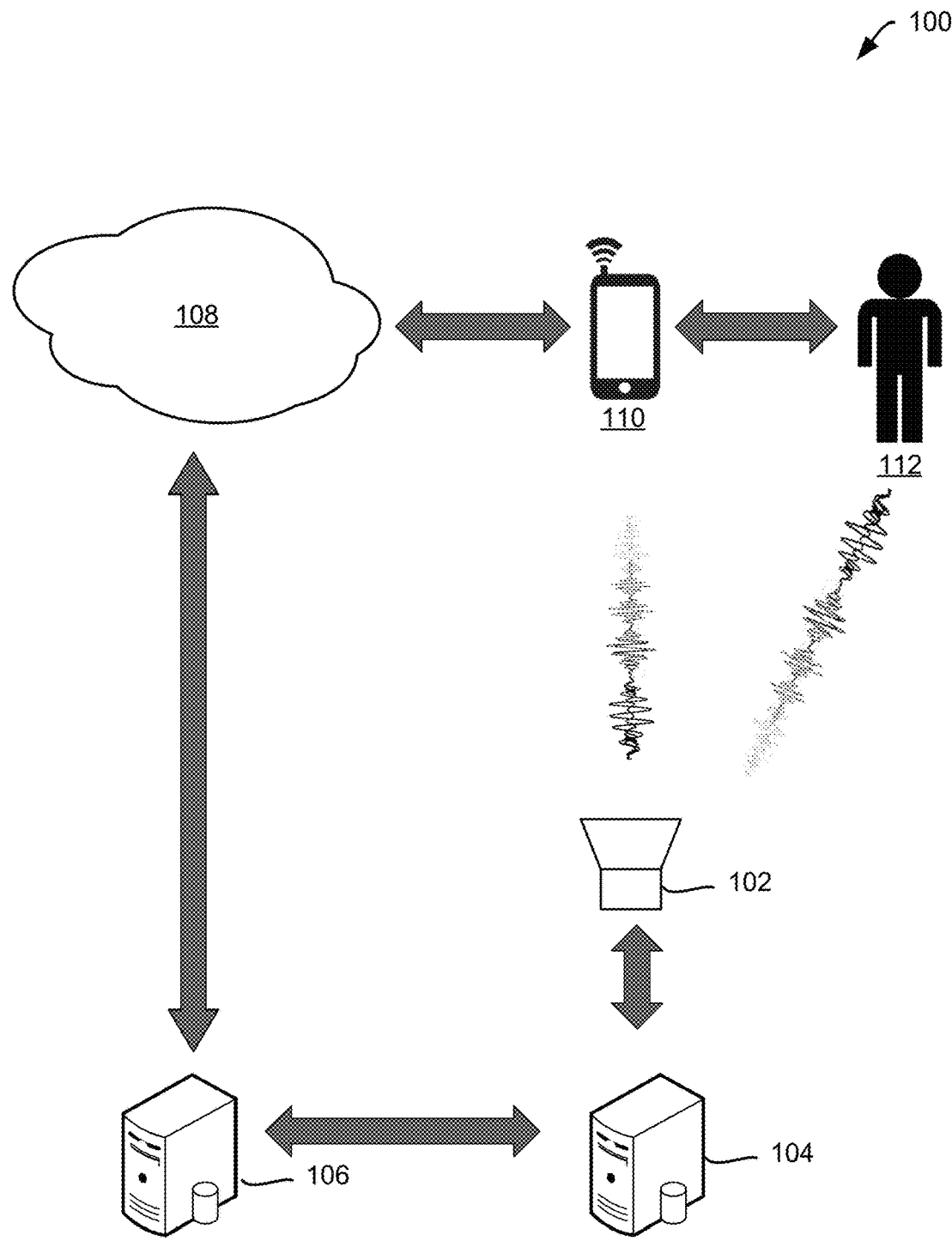
FIG. 1 is an illustrative representation of a system for performing authentication using a sonic one-time password and smart speaker system according to an embodiment.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

As previously mentioned, current user authentication in voice-controlled systems relies primarily on user authentication via user voice recognition. This is a form of biometric user authentication, which is deeply flawed and presents a poor user experience.

The current proliferation of voice, word, and phrase recognition engines, like the AMAZON ALEXA® and smart speaker technology like the AMAZON® ECHO®, are shaping the way the Internet of things (IoT) will be controlled in the future. These technologies are being connected to IoT hubs, and via these hubs, to connected devices managed by voice commands received via smart speakers. This creates a vital security requirement that, at least in some instances, only an authenticated, authorized user is to be permitted to access voice command-controlled devices. It may also be important that users can easily grant permission to other users to have equal or limited access to systems controlled via voice commands. The currently growing trend toward a shared economy makes this capability necessary and critical for multi-user secure access to IoT implementations. Some obvious examples are voice controlled smart homes and voice control in automobiles.

There are number of issues that need to be addressed with respect to user authentication security via user voice recognition biometrics, such as:

1. The user experience is difficult in that it requires that the system be trained for each authorized user by multiple repetition of training words or phrases;

2. A false negative user voice recognition result, which has plagued this industry, may lock users out of their system;

3. A false positive user voice recognition may result in unauthorized access to sensitive user data and Personally Identifiable Information (PII) protected under the current General Data Protection Regulation laws;

4. A false positive user voice recognition may result in unauthorized financial transactions; and 5. A false positive user voice recognition may result in unauthorized access to sensitive IoT systems.

In one conventional example, a voiceprint may be utilized as a credential, which may operate in a manner similar to a password (which may also operate as a credential). Accordingly, in a manner similar to that of a password, a voiceprint can be stolen. Phishing attacks to get user biometrics continue to occur. Millions of fingerprints had been stolen from the US government last year, which makes all affected users vulnerable to biometric hacks. If a user biometric voice record is stolen, it may be difficult to change a voiceprint in a manner similar to that of changing a password. Accordingly, a victim of a stolen voiceprint may be at risk for a long period of time, unless, of course, the victim's voice can be changed, which may be difficult or impossible.

Recent advances in voice modeling have made audio-based biometrics simple to spoof. In addition, user voice recognition is rendered useless in noisy environments, locking users out of their IoT systems.

However, embodiments disclosed herein may include a secure, noise-resilient user authentication system, which may overcome a number of the weaknesses inherent in speaker recognition and other forms of biometric user authentication. Turning to FIG. 1, is an illustrative representation of a system for performing authentication using a sonic one-time password and smart speaker system according to an embodiment, where smart speaker 102 (e.g. AMAZON ECHO®) may communicate with smart speaker server 104 (e.g. AMAZON ALEXA®), which may perform word and phrase recognition. In response to user 112 verbally requesting authentication, such as by enunciating "Authenticate me" or some other suitable phrase. In some embodiments, authentication server (ASRV) 106 may determine a need for authentication in view of the type of function smart speaker server 104 is asked to perform. In response to receipt of an authentication request, the smart speaker server 104 server may contact ASRV 106, or other suitable authentication service, which may provide a one-time password (OTP) via tone, token, or other type of data element. The smart speaker server, 104 may then transmit the tone which may be played by smart speaker 102. The tone may be received and decoded by the mobile app residing on mobile device 110 belonging to user 112. Mobile devices, in embodiments, may include any device capable of playing sound files and communicating over wired or wireless networks 108. The OTP tone is decoded and sent to ASRV 106. The user is identified and the user identifying information is sent to smart speaker server 104 to confirm that an authorized user has been identified. Smart speaker server 104 may then approve and execute a command, which may activate devices connected to the IoT hub controlled by smart speaker 102.

Figure 2:
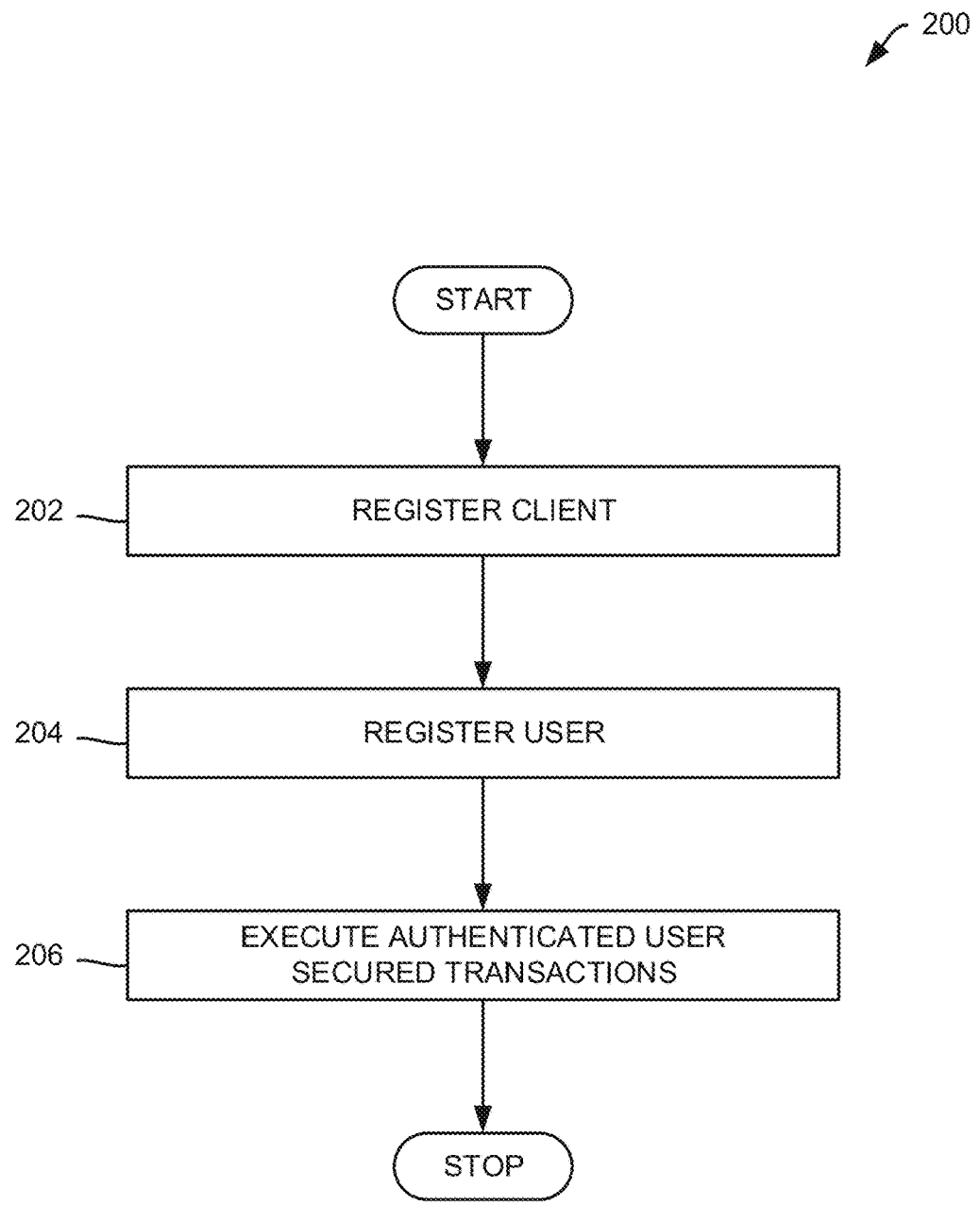
FIG. 2 is an illustrative flowchart of methods for performing authentication using a sonic one-time password and smart speaker system according to an embodiment.

FIG. 2 is an illustrative flowchart 200 of methods for performing authentication using a sonic one-time password and smart speaker system according to an embodiment. At a first step 202, the method registers a client. A client is an entity that subscribes to the authentication system to provide authenticated users with goods or services or both. At a next step 204, the method registers a user. Notably, registering a user may occur regardless of whether there are registered clients as the steps 202 and 204 are independent of one another. Registering a user requires a user to download and run an application on their mobile device (i.e. mobile app) that will enable communication between the user's mobile device and an ASRV. Once registration is completed, the method enables authenticated users to execute secure transactions at a step 206, which will be discussed in further detail below for FIGS. 3 and 4. The method then ends. This flowchart represents an overview of the authentication system. The steps, while presented in order, may occur in any order and may occur in any number. For example, may clients may register before users are registered and vice versa.

Figure 3:
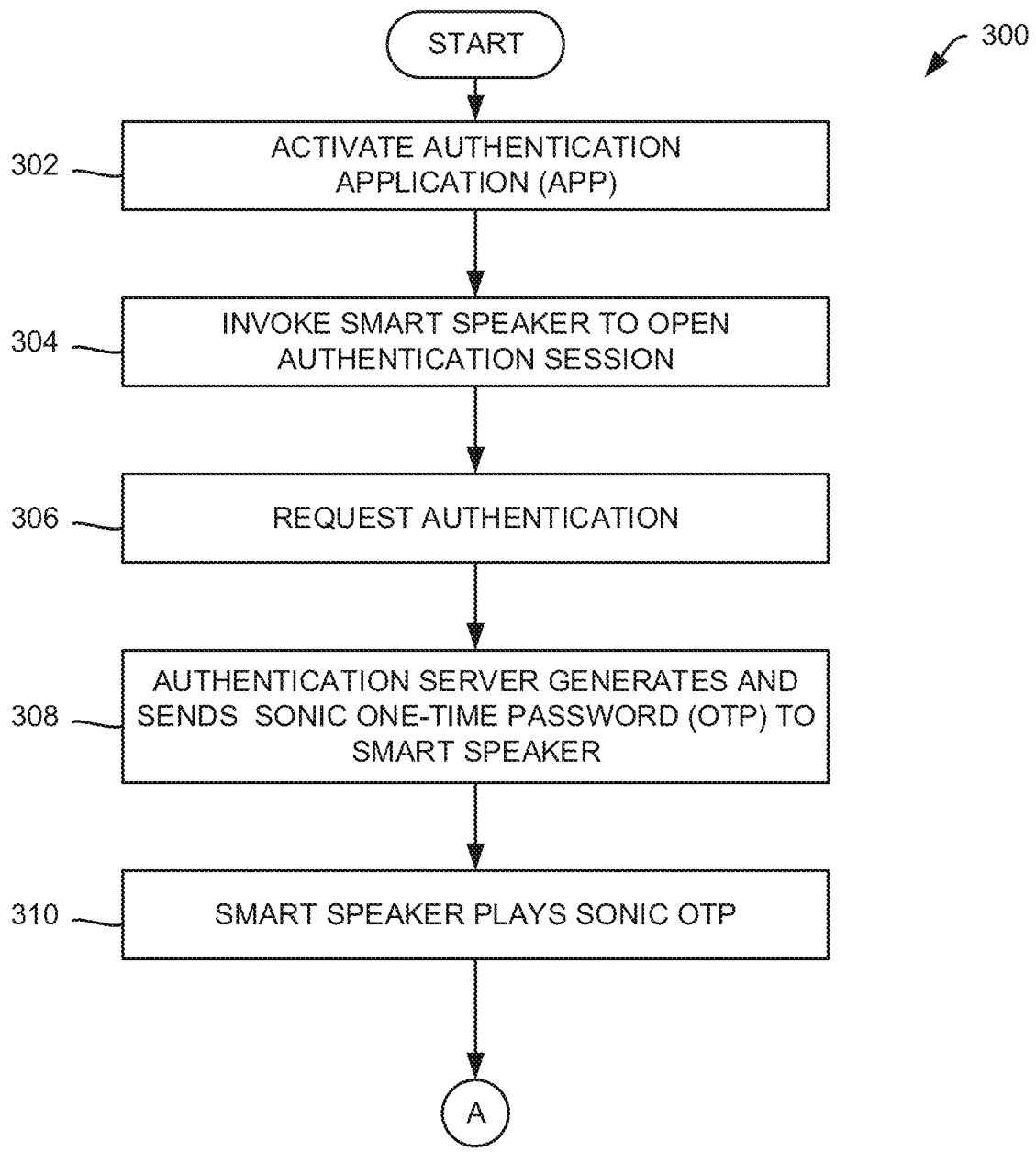
FIG. 3 is an illustrative flowchart of methods for performing authentication using a sonic one-time password and smart speaker system according to an embodiment.

FIG. 3 is an illustrative flowchart 300 of methods for performing authentication using a sonic one-time password and smart speaker system according to an embodiment. At a first step 302, the method requires the authentication app to be activated by a user desiring to conduct a secure transaction. The authentication app may be run in background or may be started and stopped as desired by a user. At a next step 304, the user invokes the smart speaker to open an authentication session. Thus, in one embodiment, a user may use a voice command such as, "authenticate me," directed to a smart speaker. Any suitable command may be programmatically enabled in embodiments. At a next step 306, the method requests authentication. In practice, the smart speaker, upon receiving the voice command forwards the request to a smart speaker server (see FIG. 1, 104). The smart speaker server interprets the voice command and makes a request to an ASRV (FIG. 1, 106) to authenticate the user. At a next step 308, the method generates and sends a sonic one-time password (OTP) to the smart speaker. In this implementation, the ASRV generates a sonic OTP. An OTP may be a randomly generated number, the result of a hash operations, or a variety of other mathematical operations. An OTP may be derived from a true random number generated by a software or hardware random number generator. Hardware Security Modules may be used to generate and store root keys from which random numbers and therefore OTPs are generated. OTPs can be generated by cryptographic means or as random tokens. OTPs are destroyed when the transaction duration expires. The OTPs are made more secure by their short lifespan—a typical OTP authentication process can be as short as 200 msec. In some cases, the OTP authentication process window may be kept open longer, sometimes up to 10 sec. to account for extreme connection delays, but a typical OTP authentication process window is less than ½ sec. In one embodiment, a sonic OTP is generated by the ASRV is encoded in an audio or sonic file such as an MP3 file, as a result of a verbal request to the smart speaker for user authentication. In other embodiments, the sonic OTP is generated by a rule, which may require certain types of voiced transactions to apply robust user authentication and is transmitted from the ASRV to a smart speaker server such as, for example, an AMAZON® ALEXA® server.

OTP sonic encoding technology presented herein utilizes advanced DSP algorithms including an audio codec. The signal generation portion of the audio codec resides at the ASRV while the decode portion is part of the mobile app. In one embodiment, the sonic OTP encoding requires that each OTP bit is coded in a narrow band spread spectrum audio signal centered at the far end of the decodable audio spectrum. Each OTP bit is represented by a 63-chip Pseudo Noise (PN) sequence symbol, which is correlated to securely stored PN patterns in the application's DSP codec algorithm. Each OTP bit packet is verified with advanced error checking and error correction algorithms resulting in high reliability and noise resiliency.

The sonic OTP is the ONLY item transmitted sonically and can only be used once. No user specific information is ever contained in the sonic transmission so that no user credentials are in flight or exposed to a potential attack. This constitutes a credential-less, bi-lateral authentication methodology which is highly secure. In embodiments, this transmission is made securely via SSL links which encrypt the transmission of an audio file such as an MP3 file. The SSL channel is established by mutual authentication of SSL certificates, which provides a secure channel for the ASRV connection with a smart speaker server.

At a next step 310, the method plays the sonic OTP on the smart speaker. At this point the user's mobile device must be near or in close proximity to the smart speaker to receive the sonic OTP. The sonic OTP requires modulating a carrier signal to carry a data payload that contains the OTP using one or more near field communications technologies and protocols. Added security may be provided by the proximity between the smart speaker and the user's mobile device necessary for the sonic OTP transmission to be successful. This may also be true in the case of other near field communication (or short-range) transmission such as Bluetooth and low power Wi-Fi, which may be used in other embodiments. All of these are examples of techniques in which near field communication, taking place over a short-range, ensures proximity of the mobile phone, and the speaker. Accordingly, the authentication process may be difficult or impossible to "hack," such as by a user located in another state, another country, or even on another continent.

Figure 4:
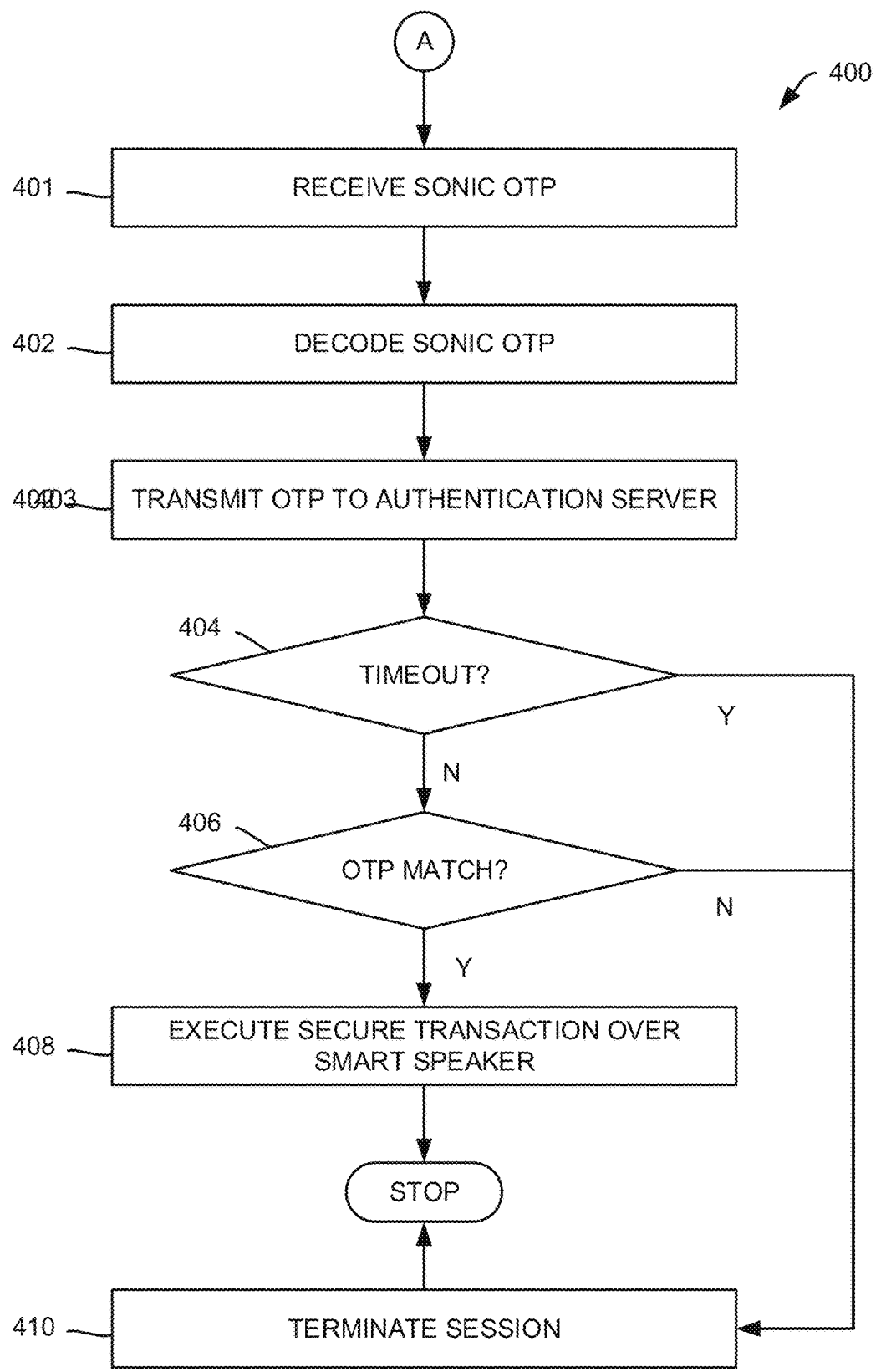
FIG. 4 is an illustrative flowchart of methods for performing authentication using a sonic one-time password and smart speaker system according to an embodiment.

FIG. 4 is an illustrative flowchart 400 of methods for performing authentication using a sonic one-time password and smart speaker system according to an embodiment. In particular FIG. 4 continues from a step 312 of FIG. 3. At a first step 401, the method receives the sonic OTP by the mobile device and the mobile app. Upon receiving the sonic OTP, the method decodes the sonic OTP to render the OTP at a step 402. At a next step 403, the mobile app transmits the OTP to the ASRV. As such, in the embodiment, the mobile app receives and decodes the sonic OTP that was received from the smart speaker so that the original OTP generated by the ASRV may now be sent back to the ASRV by the mobile app to verify the authenticity of the user. This transmission is made securely via SSL links which encrypt the transmission of the decoded OTP. In addition, in some embodiments, the app appends a unique APP ID and mobile device profile to the OTP that may be matched against information from the user registration.

At a next step 404, the method determines whether a timeout is required. As noted above, a typical OTP authentication process can be as short as 200 msec. In some cases, the OTP authentication process window may be kept open longer, sometimes up to 10 sec. to account for extreme connection delays, but a typical OTP authentication process window is less than ½ sec. Thus, if the method determines, for example, that the process window time is exceeded at a step 404, the method continues to a step 410 to terminate the session whereupon the method ends. Other conditions may be utilized to timeout the session without limitation such as, for example exceeding the number of tries to receive the sonic OTP. If the method determines at a step 404 that a timeout is not required, the method continues back to a step 406 to determine whether the OTPs match. Once the OTP is received by the ASRV via an SSL link to complete an authentication cycle, the received OTP is compared to the OTP originally sent by ASRV and is accepted as a match, within a short timeout window or it is rejected as not valid. If the OTP is accepted as a match at a step 406, the user authentication is successful whereupon the method continues to a step 408 to allow the user to execute secure transactions over the smart speaker.

It is important to note that as an ASRV first receives an OTP request from a known smart speaker server, and from a known smart speaker session communicated to ASRV by the smart speaker server and then receives the OTP back from the user's mobile device app, the ASRV has verified BOTH sides of this transaction thereby authenticating the user as well as the smart speaker service being used. This defeats a type of spoofing attack where a user may unknowingly be authenticating themselves to an illegitimate service.

Figure 5:
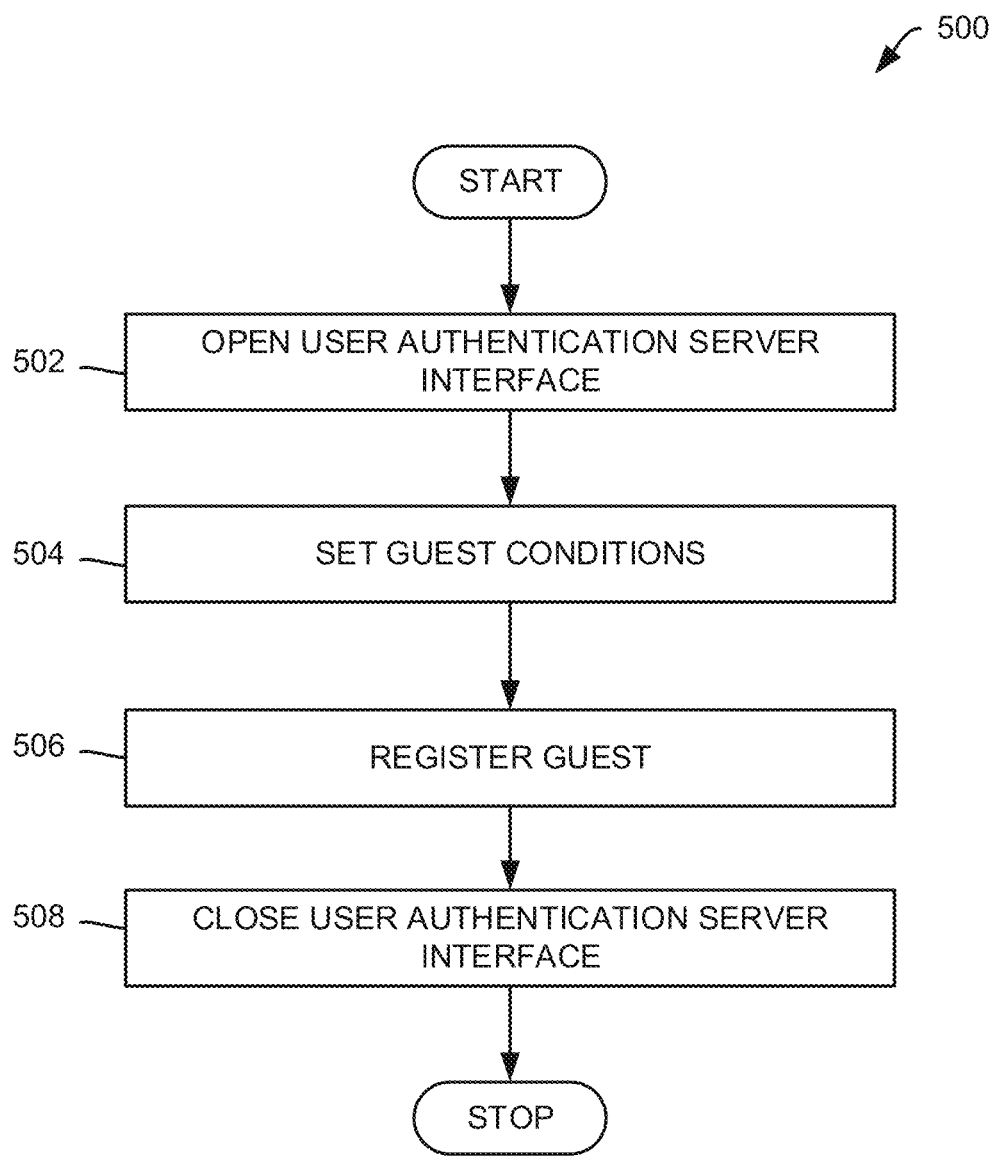
FIG. 5 is an illustrative flowchart of methods for performing authentication using a sonic one-time password and smart speaker system according to an embodiment.

FIG. 5 is an illustrative flowchart of methods for performing authentication using a sonic one-time password and smart speaker system according to an embodiment. It may be desirable to authenticate a user's guest to execute secure transactions over the user's smart speaker system. In this example, a user may wish to give limited access to a guest for a limited period of time. Thus, at a step 502, a user authentication server interface is opened by a user using the mobile device authentication app. At a step 504, the user sets guest conditions such as access duration and access limitations. The guest may then register their device at a step 506 whereupon the method closes the user authentication server interface at a step 508. In one embodiment, if the guest already has an authentication app, the user may enter the guest's email address in the User Authentication Server Interface, which connects to the ASRV. The ASRV may match the email address to the email address stored in the guest's profile and enable the authorized access under the guest conditions set by the user. The guest may then proceed as outlined in FIGS. 3 and 4 to utilized authentication methods disclosed therein.

Additional proximity confirmation may be provided by checking IP based geo-location of the smart speaker to the GPS based location of the user's mobile device.

Authentication may be required for every voice command or only for voice commands affecting sensitive devices (as defined by users or as preset by an IoT system administrator) or may be set to remain valid for a period of time, which could be specified by the authenticated system user.

In another embodiment, the sonic OTP communication may be replaced by an OTP sent via Bluetooth or Low-Power Wi-Fi. Although communication via a sonic signal may be simpler and easier to use, particular embodiments may benefit from use of Bluetooth and/or low-power Wi-Fi to ensure that the mobile phone is proximate to the smart speaker. In another embodiment, the user may have a smart speaker application, an authentication application or another suitable application, such as an application installed on mobile phone, to receive push notifications to alert the user that an authentication is required and to turn on the authentication app on the user's mobile device. The user would then click on the push notification to turn on the authentication application, which will listen and then process an OTP transmission sent via near field or other short-range communication techniques, such as sonic or Bluetooth or low power Wi-Fi. The push notification does not provide proximity confirmation for added security, so confirming proximity with an OTP transmission sent via NFC transmission adds more security. Nonetheless, in some embodiments, receiving and confirming a push notification may provide sufficient user authentication to allow a user authorized access to restricted smart speaker functions.

In other embodiments, the user may register their phone number with a smart speaker server during, or prior to the installation of their smart speaker at home. Then every time the smart speaker server receives a request for user authentication or whenever it receives a command, which it understands to be a command to activate IoT devices or to perform any action, which should require authentication of user, it may send an SMS to the user's phone to confirm that the user wishes to execute the command. The SMS may include the text of the command for out-of-band command confirmation.

In an embodiment, out-of-band command confirmation provides additional security for sensitive voice commands used to activate sensitive systems or gain access to information. Out-of-band confirmation is a mechanism whereby a message, transaction or an action sent by one channel, in our case by user's voice, is confirmed by another, independent channel. This is used to defeat Man in the Middle attacks, which may compromise one of the channels. This would be accomplished by sending the voice command in text format via SMS as described above to the user's mobile device for confirmation, or it may be displayed within an app on a user's mobile device for a user to confirm it. The confirmation may be done by clicking on a confirming link provided with the displayed voice command text. The ASRV or any app integrated with the ASRV technology or with other authentication technologies is an ideal vehicle via which out-of-band confirmation may be easily delivered.

In other embodiments the displayed voice command text may be sent via push notification to an app resident on a user's mobile device.

In other embodiments the original or "system owner" user may wish to authorize another user to have the ability to be authenticated by a smart speaker server and thereby to have the smart speaker server execute commands, which require authentication, as shown in FIG. 5. The other user may be granted full or limited permissions, which may be permanent or expire after some period of time, which the "system owner" may deem appropriate. This may be done by app to app authentication if the two users are proximate. In this embodiment an app may send a sonic tone containing an OTP from one users phone app to another user's phone app. The OTP will pass through both users' phones apps and return to the ASVR thereby identifying and authenticating both users to each other. In other embodiments other means—such as Bluetooth or low power Wi-Fi—of transmitting an OTP via NFC may be used, or the user authentication may be done remotely as one authentication app may send a request to the "system owner" authentication app identifying a user who may request authorization and the "system owner" may grant such an authorization.

In an embodiment, user authentication for voice-controlled systems with added security provided by checking IP based geo-location of the smart speaker and comparing it to the GPS based location of the user's mobile device. In an embodiment, an out-of-band command confirmation for voice-controlled systems by sending the voice command text, which may be displayed within an app on a user's mobile device for user to confirm it. Said confirmation may be done by clicking on a confirming link provided in the displayed voice command text. In an embodiment, an out-of-band command confirmation for voice-controlled systems by sending an SMS to the user's mobile device to confirm user action, where the voice command text may be displayed for user to confirm it. Said confirmation may be done by clicking on a confirming link provided in the SMS.

In an embodiment, the out-of-band command confirmation for voice-controlled systems by sending a push notification to a user's app installed on a user's mobile device to confirm user action, where the voice command text may be displayed for user to confirm it. The confirmation may be done by clicking on a confirming link provided in the push notification. In an embodiment, user authentication may remain valid or all voice commands occurring during a period of time from a first authentication, which period of time may be controlled and altered by an authenticated user.

In an embodiment, user authentication may be repeated for every command requiring authentication by sending a sonic OTP after receipt of a command which a smart speaker server may identify as a command requiring user authentication, said sonic OTP being received by the user's mobile device, said user's mobile device having an application which has been left on for the duration of activity which may require repeated authentications. In an embodiment, user authentication may be repeated for every command requiring authentication by sending a sonic OTP after receipt of a command which the smart speaker server may identify as a command requiring user authentication, said sonic OTP being received by the user's mobile device, said user's mobile device having an application which runs in the background and may receive a sonic OTP within the duration of activity which may require repeated authentications, even if the said application is tuned off.

Although illustrative embodiments of the invention have been described in detail herein with reference to the accompanying drawings, it is to be understood that the invention is not limited to those precise embodiments, and that various changes, additions and modifications can be affected therein by one skilled in the art without departing from the scope of the invention as defined by the appended claims. For example, various combinations of the features of the dependent claims could be made with the features of the independent claims without departing from the scope of the present invention.

In one such embodiment, the user may request authentication as in previous embodiments, but the sonic OTP would be transmitted from the user's authentication app to the smart speaker. The microphone contained in the smart speaker would receive the sonic OTP, transmit it to the smart speaker server, which would then transmit it to the ASRV to decode the sonic OTP and extract the OTP for OTP match verification as in previous embodiments. In this embodiment, the OTP transmission cycle is reversed, as the OTP generated by the ASRV is sent to the authentication app and then received by the smart speaker. In this embodiment, the OTP may be sent to the authentication app as a sonic OTP in audio format such a .WAV or MP3 or in its unencoded, raw format, in which case the OTP would be encoded into a sonic OTP by the app prior to sonic transmission from the user's cell phone speaker.

What is claimed is:
1. A method for authenticating a user utilizing a smart speaker system, the method comprising:
requesting a user authentication session by issuing a voice command to a smart speaker by the user;
playing a sonic one-time password (OTP) on the smart speaker received from an authentication server in response to the requesting the user authentication session;
receiving the sonic OTP by a mobile device of the user;
transmitting a decoded OTP decoded from the sonic OTP to the authentication server by the mobile device;
authorizing the user by the authentication server to execute a secure transaction using the smart speaker system; and
registering a guest on the smart speaker, wherein the registering comprises:

opening a user authentication server interface by the user;

setting a plurality of guest conditions for the guest; and closing the user authentication server interface.

2. The method of claim 1, further comprising:

in response to the requesting the user authentication session, generating an OTP by the authentication server;

encoding the OTP into a sonic OTP by the authentication server; and sending the sonic OTP to the smart speaker system.

3. The method of claim 2, wherein the sonic OTP encoding requires that each OTP bit is coded in a narrow band spread spectrum audio signal centered at a far end of a decodable audio spectrum.

4. The method of claim 3, wherein each OTP bit is represented by a 63-chip Pseudo Noise (PN) sequence symbol that is correlated to securely store a PN pattern in a DSP codec algorithm.

5. The method of claim 2, wherein the sonic OTP is an MP3 file.

6. The method of claim 2, wherein the sending is accomplished over an SSL channel established by a mutual authentication of a plurality of SSL certificates.

7. The method of claim 1, further comprising:

in response to receiving the sonic OTP by the mobile device of the user, decoding the sonic OTP by a mobile application on the mobile device.

8. The method of claim 1, wherein the authorizing the user by the authentication server comprises:

determining whether a timeout is required; and if the timeout is required, terminating the user authentication session.

9. The method of claim 8, wherein the timeout comprises a process window of less than approximately 0.5 seconds.

10. The method of claim 1, wherein the authorizing the user by the authentication server further comprises:

determining whether the decoded OTP matches the OTP encoded by the authentication server; and if the decoded OTP and the OTP do not match, terminating the user authentication session.

11. The method of claim 1, wherein the mobile device and the smart speaker are required to be located within close proximity.

12. The method of claim 11, wherein close proximity is determined by comparing a GPS based location of the mobile device and an IP geo-location of the smart speaker.

13. A system for authenticating a user comprising:

an authentication server configured to manage a user authentication session;

a smart speaker system in electronic communication with the authentication server, the smart speaker system configured to manage user data corresponding with the user authentication session; and a mobile device in wireless communication with the authentication server and the smart speaker system, the mobile device configured to manage passwords corresponding with the user authentication session, wherein the mobile device comprises a user authentication server interface for registering a guest on the smart speaker system, wherein the user authentication server interface is configured to set a plurality of guest conditions for the guest by the user.

14. The system of claim 13, wherein the authentication server comprises:

a one-time-password (OTP) generator for generating an OTP; and an OTP encoder for generating a sonic OTP from the OTP.

15. The system of claim 14, wherein the smart speaker system comprises:

a smart speaker for receiving vocal commands from a user and for playing the sonic OTP; and a smart speaker server for handling electronic communication between the smart speaker and the authorization server.

16. The system of claim 14, wherein the mobile device comprises:

a mobile application for decoding the sonic OPT to a decoded OTP.

17. The system of claim 16, wherein the authentication server further comprises:

a password comparator for comparing the OTP with the decoded OTP.

18. A method for authenticating a user utilizing a smart speaker system, the method comprising:

requesting a user authentication session by issuing a voice command to a smart speaker by the user;

in response to the requesting the user authentication session, generating an OTP by the authentication server;

encoding the OTP into a sonic OTP by the authentication server wherein the sonic OTP encoding requires that each OTP bit is coded in a narrow band spread spectrum audio signal centered at a far end of a decodable audio spectrum;

sending the sonic OTP to the smart speaker system;

playing a sonic one-time password (OTP) on the smart speaker received from an authentication server in response to the requesting the user authentication session;

receiving the sonic OTP by a mobile device of the user;

transmitting a decoded OTP decoded from the sonic OTP to the authentication server by the mobile device; and authorizing the user by the authentication server to execute a secure transaction using the smart speaker system.

* * * * *